United States Patent
Jin et al.

(10) Patent No.: US 9,430,034 B2
(45) Date of Patent: Aug. 30, 2016

(54) DATA COMMUNICATION ON A VIRTUAL MACHINE

(71) Applicant: HUA ZHONG UNIVERSITY OF SCIENCE TECHNOLOGY, Wuhan Hubei (CN)

(72) Inventors: Hai Jin, Hubei (CN); Xiaofei Liao, Hubei (CN); Kai Chen, Hubei (CN); Dong Liang, Hubei (CN)

(73) Assignee: HUA ZHONG UNIVERSITY OF SCIENCE TECHNOLOGY, Wuhan, Hubei (CN)

( * ) Notice: Subject to any disclaimer, the term of this patent is extended or adjusted under 35 U.S.C. 154(b) by 0 days.

(21) Appl. No.: 14/422,560

(22) PCT Filed: Jul. 9, 2013

(86) PCT No.: PCT/CN2013/079041
§ 371 (c)(1),
(2) Date: Feb. 19, 2015

(87) PCT Pub. No.: WO2015/003312
PCT Pub. Date: Jan. 15, 2015

(65) Prior Publication Data
US 2015/0234453 A1  Aug. 20, 2015

(51) Int. Cl.
*G06F 9/455* (2006.01)
*G06F 3/00* (2006.01)

(52) U.S. Cl.
CPC ............. *G06F 3/00* (2013.01); *G06F 9/45533* (2013.01)

(58) Field of Classification Search
None
See application file for complete search history.

(56) References Cited

U.S. PATENT DOCUMENTS

| | | | |
|---|---|---|---|
| 8,102,881 B1 * | 1/2012 | Vincent | H04L 69/161 370/474 |
| 8,429,675 B1 | 4/2013 | Radhakrishnan et al. | |
| 9,152,568 B1 * | 10/2015 | Seigler | G06F 12/0866 |
| 2004/0218527 A1 * | 11/2004 | Schwartz | H04N 21/2381 370/230 |
| 2009/0016217 A1 * | 1/2009 | Kashyap | H04L 47/2408 370/231 |
| 2009/0171677 A1 | 7/2009 | Singhal et al. | |
| 2009/0219935 A1 * | 9/2009 | Tripathi | H04L 12/4641 370/392 |
| 2009/0240793 A1 * | 9/2009 | Zhang | H04L 49/90 709/223 |
| 2011/0046759 A1 | 2/2011 | Kim et al. | |
| 2012/0023195 A1 * | 1/2012 | Ansari | H04L 29/12264 709/217 |

FOREIGN PATENT DOCUMENTS

| | | |
|---|---|---|
| CN | 103077153 A | 5/2013 |
| EP | 2075688 A1 | 7/2009 |
| WO | 2010135430 A1 | 11/2010 |

OTHER PUBLICATIONS

Barham, P., et al., "Xen and the art of virtualization," In 19th ACM Symposium on Operating Systems Principles, vol. 37, No. 5, pp. 164-177 (Oct. 2003).

Cheng, M. K., "iPhone Jailbreaking Under the DMCA: Towards a Functionalist Approach in Anti-Circumvention," In Berkeley Technology Law Journal, vol. 25, No. 215, pp. 216-246 (Jan. 2010).

(Continued)

*Primary Examiner* — Sisley Kim
(74) *Attorney, Agent, or Firm* — Brundidge & Stanger, P.C.

(57) ABSTRACT

In some examples, when a user requests a media device to play media data generated on a virtual machine or receive media data generated by the media device, the media data may be transmitted by sharing physical memory pages among different virtual machines and other virtual components.

12 Claims, 6 Drawing Sheets

(56) References Cited

OTHER PUBLICATIONS

Huang, W., et al., "Virtual machine aware communication libraries for high performance computing," In: Proceedings of Super Computing, pp. 1-12 (Nov. 2007).

International search report and written opinion for PCT application No. PCT/CN2013/079041 mailed on Mar. 27, 2014.

Kim, K., et al. "Inter-domain Socket Communications Supporting High Performance and Full Binary Compatibility on Xen," In: Proceedings of the fourth ACM SIGPLAN/SIGOPS international conference on Virtual execution environments, pp. 11-20 (Mar. 2008).

Menon, A., et al., "Diagnosing performance overheads in the xen virtual machine environment," In Proceedings of Virtual Execution Environments, pp. 13-23 (May 2005).

Menon, A., et al., "Optimizing network virtualization in Xen," In: Proceedings of USENIX Annual Technical Conference, pp. 14 (Sep. 2006).

Richardson, T., et al., "Virtual network computing," IEEE Internet Computing, vol. 2, No. 1, pp. 33-38 (Jan./Feb. 1998).

Rosenblum, M., and Garfinkel, T., "Virtual Machine Monitors: Current Technology and Future Trends," IEEE Computer, vol. 38, No. 5, pp. 39-47 (May 2005).

Wang, J., et al., "XenLoop: A Transparent High Performance Inter-VM Network Loopback," In Proceedings of 17th International Symposium on High Performance Distributed Computing, pp. 109-118 (Jun. 2008).

Zhang, X., et al., "XenSocket: A high-throughput interdomain transport for virtual machines," In Proceedings of Middleware, vol. 4834, pp. 184-203 (Nov. 2007).

* cited by examiner

DATA COMMUNICATION ON A VIRTUAL MACHINE

CROSS-REFERENCE TO RELATED APPLICATION

This Application is the National Stage filing under 35 U.S.C. §371 of PCT Application Ser. No. PCT/CN13/79041 filed on Jul. 9, 2013. The disclosure of the PCT Application is hereby incorporated herein by reference in its entirety.

TECHNICAL FIELD

The technologies described herein pertain generally to media data communication to and from a media device via a network on a virtual machine executing on a server.

BACKGROUND

Unless otherwise indicated herein, the approaches described in this section are not prior art to the claims in this application and are not admitted to be prior art by inclusion in this section.

Media data that is generated on, or received by, a virtual machine may not be reproduced on a client device absent customization of the virtual machine. Even with such customization, though, the reproduction of such media data may suffer from latency on the client device.

SUMMARY

Technologies are generally described for data communication on a virtual machine. The various techniques may be implemented in various systems, methods, and/or computer-readable mediums.

In some examples, various techniques may be implemented as systems. Some systems may include one or more virtual machines that are each configured to generate one or more media data packets and to write the generated one or more media data packets into a corresponding one of plural storage blocks. The system may further include an IP layer that is configured to retrieve the media data packets from respective ones of the storage blocks and to pack the retrieved media data packets into one or more IP data packets, a coordinator layer that is configured to receive the one or more IP data packets from the IP layer and to write the one or more IP data packets to at least one of plural physical memory pages, and a privilege component that is configured to read the one or more IP data packets from the at least one of the physical memory pages and to write the one or more IP data packets to a physical interface for transmission to a media device.

In some examples, various techniques may be implemented to include receiving one or more media data packets in a virtual environment, transmitting the one or more media data packets to an IP layer, converting the media data packets into IP data packets, writing the IP data packets into at least one of plural physical memory pages, reading the IP data packets from the physical memory pages to a physical interface, and transmitting the IP data packets to a media device.

In some other examples, various techniques may be implemented as executable instructions stored on one or more computer-readable mediums that may store executable instructions that include receiving one or more IP data packets from a source device, writing the one or more IP data packets into one or more physical memory pages, reading the one or more IP data packets from the one or more physical memory pages, and extracting one or more media data packets from the one or more IP data packets.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items. In the drawings.

DETAILED DESCRIPTION

Figure 1:
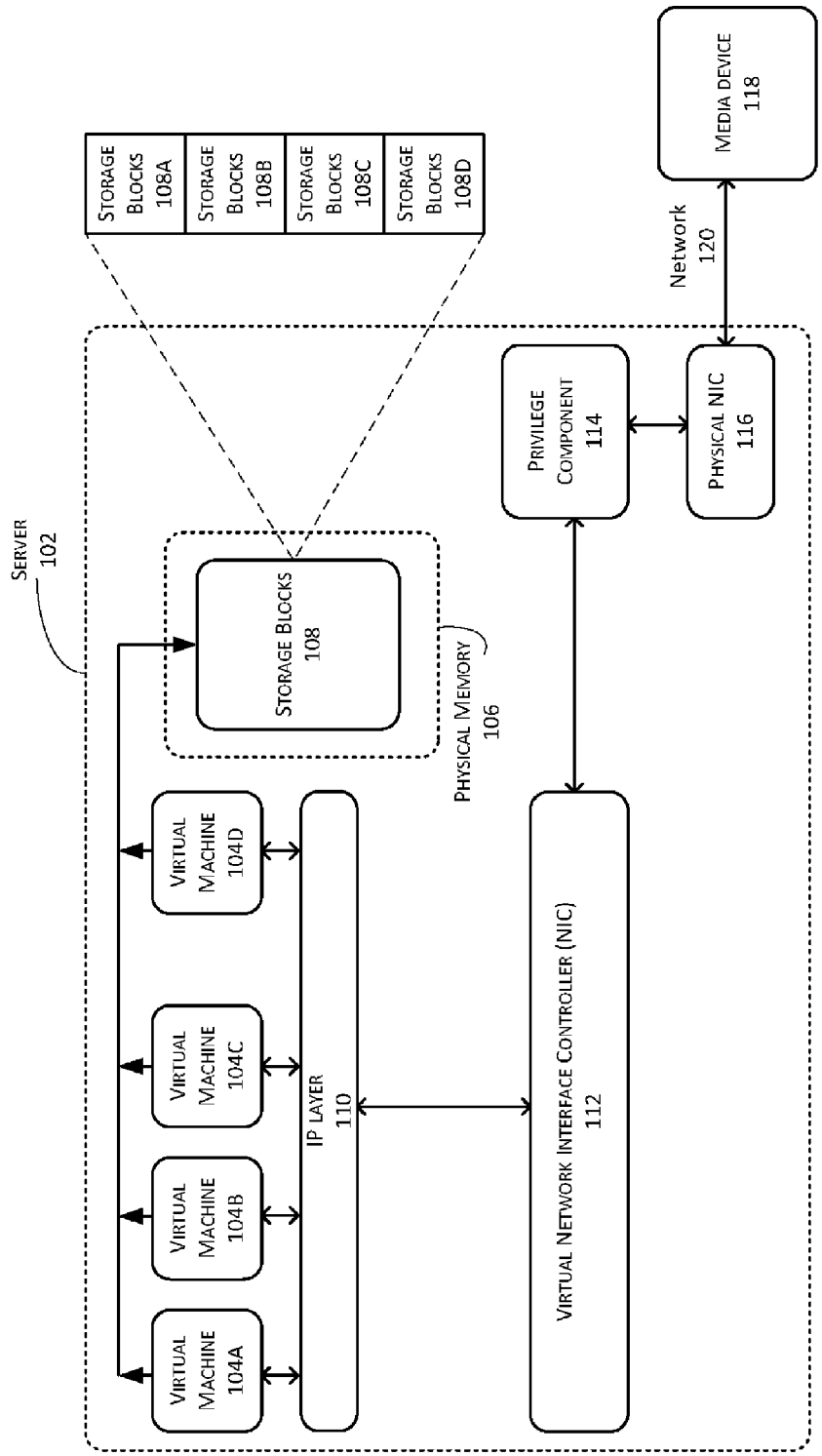
FIG. 1 shows an example system by which data communication on a virtual machine may be implemented, arranged in accordance with at least some embodiments described herein.

In the following detailed description, references are made to the accompanying drawings, which form a part of the description. In the drawings, similar symbols typically identify similar components, unless context dictates otherwise. Furthermore, unless otherwise noted, the description of each successive drawing may reference features from one or more of the previous drawings to provide clearer context and a more substantive explanation of the current embodiment. Still, the embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

FIG. 1 shows an example system 100 by which data communication on a virtual machine may be implemented, arranged in accordance with at least some embodiments described herein. As depicted, example system 100 may include, at least, a server 102 communicatively coupled to a media device 118 via a network 120. Server 102 may include one or more virtual machines 104A, 104B, 104C, . . . 104N; a physical memory 106 that includes one or more storage blocks 108A, 108B, 108C, . . . , 108N; an IP layer 110; a virtual network interface controller (NIC) 112; a privilege component 114; and a physical NIC 116. Unless context requires specific reference to one or more of virtual machines 104A, 104B, 104C, . . . , 104N, reference may be made collectively to "virtual machines 104," below; similarly, reference may be made collectively to "storage blocks 108," below.

Server 102 may refer to a physical computer, or a computer hardware system, that is configured to execute one or more hosted computing services to serve the needs of one or more other computers on network 120. Operating systems, such as Microsoft Windows®, Linux, OS X, etc., may be executed on server 102 to allow a variety of software programs to be executed on or by one or more of the hardware components server 102. Server 102, in some examples, may include one or more hardware components (not shown) including Central Processing Units (CPU), physical storage space, memories, network ports, network interface controller, etc.

Virtual machines 104 may refer to one or more software emulations of one or more physical machines (e.g., computer) executing on server 102. Virtual machines 104 may have appropriate operational access to cooperate with one or more of the hardware components of server 102 to execute software programs in the same manner as on physical machines. Notably, "virtual machine," as referenced herein, may or may not have direct correspondence to any physical machines. Virtual machines 104, in accordance with some examples, may be configured to generate media data packets that may be temporarily stored in storage blocks 108, which may further be transmitted to or obtained by IP layer 110.

Physical memory 106 may refer to a physical component of server 102 that may be configured to store data on a temporary or permanent basis. The read/write speed of physical memory 106 may be exponentially faster than that of a hard disk drive or an optical drive based on moving mechanical parts. For instance, whereas a hard disk drive may have a read/write speed of around 0.2 GB/sec, the read/write speed of physical memory 106 may exceed 8 GB/sec. Such values are provided as examples only for the purpose of explanation, and not intended to be limiting in any manner. Physical memory 106 may be configured to store the media data packets generated by virtual machines 104. In accordance with some examples, physical memory may include storage blocks 108.

Storage blocks 108 may refer to one or more blocks of physical memory 106, each of which may be designated to a respective one of virtual machines 104. That is, each of storage blocks 108 may be configured to permanently or temporarily store the media data packets generated by each of virtual machines 104, respectively. In accordance with some examples, for data safety concern, the access to a specific storage block, e.g., storage block 108A, may be limited to a specific corresponding virtual machine, e.g., virtual machine 104A. That is, with regard to the above example, storage block 108A may be exclusively accessible to virtual machine 104A, and therefore none of the others of virtual machines 104 may access storage block 108A.

IP layer 110 may refer to one or more software components or modules, executing on server 102, that may be configured to pack the media data packets into one or more IP data packets. That is, in accordance with some examples, IP layer 110 may be configured to retrieve the media data packets from respective ones of virtual machines 104 and pack, or convert, the media data packets into one or more IP data packets, i.e., organize the media data packets in accordance with Internet Protocol. For example, each IP data packet may be configured to include an IP header and a payload. The IP header may include a source IP address, e.g., the IP addresses of the respective ones of virtual machines 104; a destination IP address, e.g., the IP address of media device 118; and other metadata that may be utilized to transmit data to the destination IP address. The payload may include the data included in the media data packets. In some examples, IP layer 110 may further include a transmission layer (not shown in the drawings) for the purpose of receiving the media data packets from virtual machines 104.

Virtual network interface controller (NIC) 112 may refer to a software component or module, executing on server 102, that may be configured to emulate a physical NIC to transmit data between virtual machines 104, via IP layer 110. Virtual NIC 112 may have virtually identical transceiving properties as a physical NIC, except for transmitting data on a virtual network on server 102 between virtual machines 104. That is, the transmission speed of virtual NIC 112 may be the same as that of a corresponding physical NIC that virtual NIC 112 emulates, e.g., 1,000 megabits per second (Mbps). In accordance with some examples, virtual NIC 112 may be configured to transmit the IP data packets to privilege component 114 from IP layer 110.

Privilege component 114 may refer to a software component or module that may be configured to emulate a physical computer having or possessed with authority to access one or more of the hardware components of server 102. In accordance with some examples, privilege component 114 may be configured to assign storage blocks 108 to corresponding ones of virtual machines 104, although privilege component 114 may not necessarily have access to the data stored in storage blocks 108 after the respective ones of storage blocks 108 are assigned to virtual machines 104. With the authority to access one or more of the hardware components of server 102, privilege component 114 may control physical NIC 116 to transmit the IP data packets received from virtual NIC 112 over network 120.

Physical NIC 116 may refer to a physical component of server 102 that may be configured to transmit and receive data over network 120 under the control of privilege component 114. That is, physical NIC 116 may transmit the IP data packets received from privilege component 114 to media device 118 that is communicatively coupled to server 102 over network 120.

Media device 118 may refer to a computing device that may be configured to receive and decode the IP data packets and to further extract one or more media data packets from the IP data packets. Media device 118 may be further configured to process the extracted media data contained in the media data packets. That is, media device 118 may generate audible sound or visible images based on the extracted media data. Similarly, media device 118 may be further configured to process media files and generate one or more media data packets. In accordance with some examples, media device 118 may be implemented as a wireless communication device. In some other examples, media device 118 may be implemented as a virtual machine executing on server 102.

Network 120 may refer to one or more communication links that follow at least one of multiple communication protocols. The communication protocols may include any mobile communications technology, e.g., GSM, CDMA, etc., depending upon the technologies supported by particular wireless service providers. The one or more communication links may be implemented utilizing non-cellular technologies such as Wi-Fi™, wireless local area network (WLAN or IEEE 802.11), WiMAX™ (Worldwide Interoperability for Microwave Access), Bluetooth™, hard-wired connections, e.g., cable, phone lines, and other analog and digital wireless voice and data transmission technologies.

In accordance with some examples, virtual machines 104 may be configured to generate one or more media data packets as part of the execution of one or more software programs, e.g., executing a media player program to play audio files. The one or more generated media data packets may be temporarily stored in one of storage blocks 108, e.g., storage block 108A, corresponding to a respective one of virtual machines 104 that generates the one or more media data packets, e.g., virtual machine 104A. Further to the example, virtual machine 104A may transmit the one or more generated media data packets to IP layer 110, which may be configured to convert the one or more generated media data packets into one or more IP data packets. Virtual NIC 112 may be configured to obtain or receive the one or more IP data packets from IP layer 110 and to transmit the one or more IP data packets to privilege component 114. Upon receiving the one or more IP data packets, privilege component 114 may transmit the one or more IP data packets to physical NIC 116, which may further transmit the one or more IP data packets to media device 118 over network 120. Media device 118 may be configured to decode the one or more IP data packets, extract the one or more media data packets from the one or more IP data packets, and process the media data contained in the one or more media data packets, e.g., play the sound wave on media device 118. Processing the media data may further include, e.g., streaming video on media device 118.

In accordance with some other examples, media device 118 may be configured to generate one or more media data packets and to convert the one or more generated media data packets to one or more IP data packets. Further, media device 118 may transmit the one or more IP data packets to physical NIC 116 over network 120. With the authority to access one or more of the hardware components of server 102, privilege component 114 may be configured to receive the one or more IP data packets from physical NIC 116 and to re-transmit the one or more IP data packets to virtual NIC 112. IP layer 110 may be configured to receive or obtain the one or more IP data packets from virtual NIC 112 and to convert the IP data packets into one or more media data packets. The one or more media data packets may be transmitted to one of virtual machines 104 and processed thereon.

Thus, FIG. 1 shows an example system 100 in which transmitting and receiving data on a virtual machine may be implemented, arranged in accordance with at least some embodiments described herein.

Figure 2:
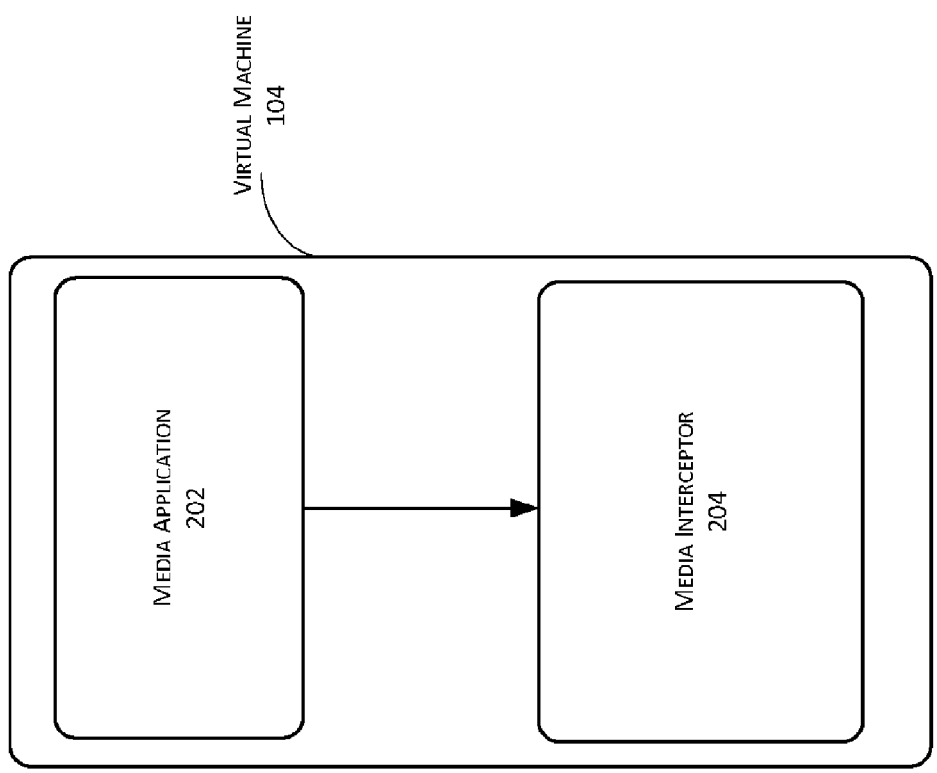
FIG. 2 shows an example virtual machine for which data communication may be implemented, arranged in accordance with at least some embodiments described herein.

FIG. 2 shows an example virtual machine 200 for which data communication may be implemented, arranged in accordance with at least some embodiments described herein. As depicted, example virtual machine 200 may include, at least, a media application 202 and a media interceptor 204.

Media application 202 may refer to a software component, module, or program, e.g., a virtual audio player, that is executable on virtual machine 200 and that may be configured to process media files and to generate media data. Non-limiting examples of media application 202 may include Windows Media Player®, QuickTime Player®, iTunes®, Amarok, Audacious, Banshee, Mplayer, Rhythmbox, Totem, VLC, and xine.

Media interceptor 204 may refer to a software component, module, or program executable on virtual machine 200 that may be configured to intercept the media data and packetize the media data in to one or more media data packets when media application 202 submits the media data to a virtual media adapter (not shown in FIG. 2). The one or more media data packets may be in a format that can be played without a proprietary coder-decoder (CODEC). As referenced herein, "intercept" may refer to obtaining media data when the media data are to be transmitted to a virtual media adapter, which may or may not exist in example system 100. When a virtual media adapter is not provided and the media data are to be reproduced on media device 118, the one or more media data packets may be transmitted to IP layer 110 by media interceptor 204. For example, media interceptor 204 may be implemented as an audio interceptor to intercept one or more audio data packets generated by a virtual audio player and, further, to transmit the one or more audio data packets to IP layer 110.

Thus, FIG. 2 shows an example virtual machine 200 by which transmitting and receiving data on a virtual machine may be implemented, arranged in accordance with at least some embodiments described herein.

Figure 3:
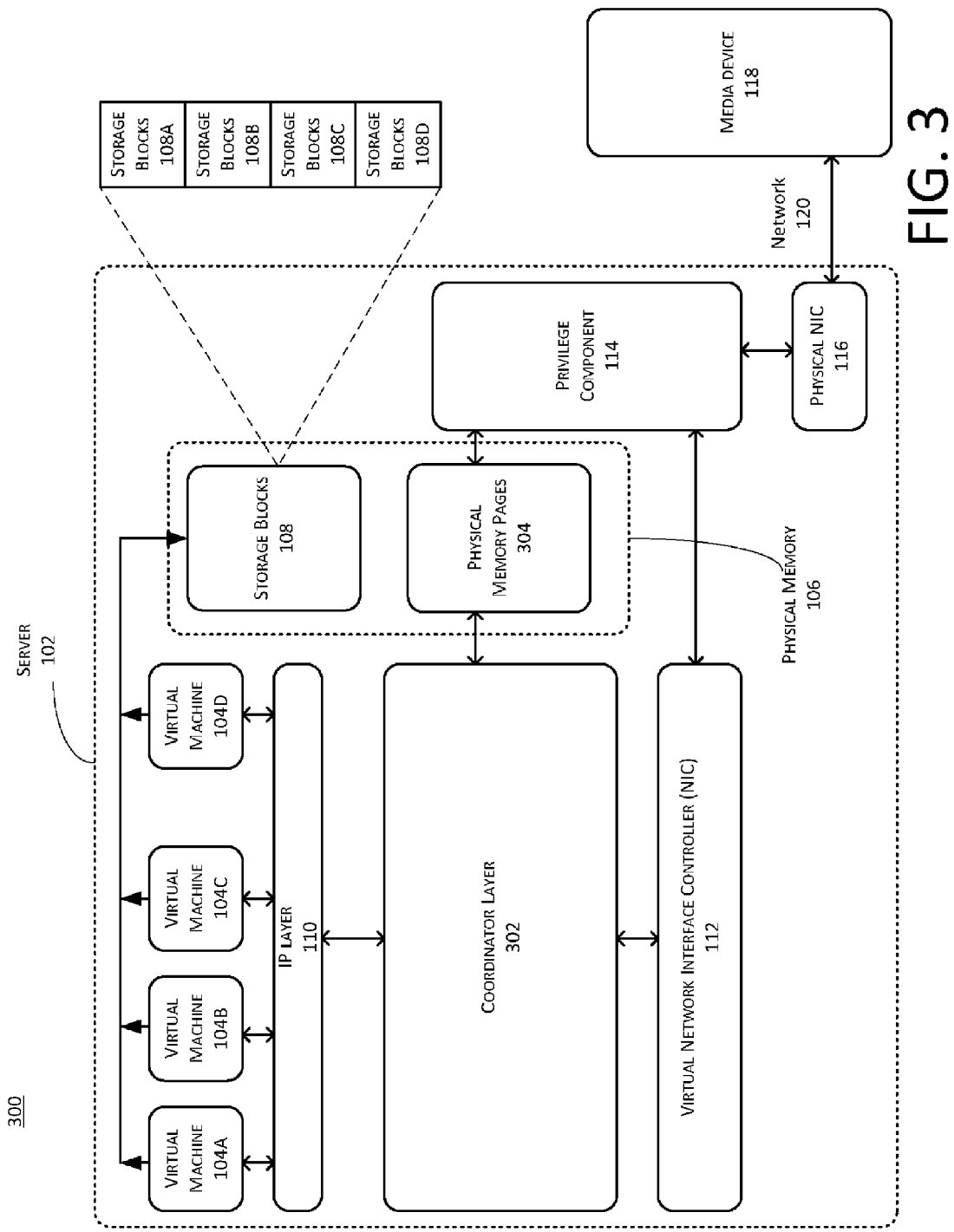
FIG. 3 shows another example system by which data communication on a virtual machine may be implemented, arranged in accordance with at least some embodiments described herein.

FIG. 3 shows another example system 300 by which data communication on a virtual machine may be implemented, arranged in accordance with at least some embodiments described herein. As depicted, example system 300, in addition to the features included in example system 100, may include, at least, a coordinator layer 302 and one or more physical memory pages 304.

Coordinator layer 302 may refer to a software component or module that is executable on server 102 and that may be configured to receive one or more IP data packets from IP layer 110 and to write the IP data packets into physical memory pages 304. Coordinator layer 302 may also be configured to read one or more IP data packets from physical memory pages 304 and to transmit the one or more IP data packets to IP layer 110. In accordance with some examples, coordinator layer 302 may include one or more buffers configured to temporarily store the one or more IP data packets.

Physical memory pages 304 may refer to one or more memory partitions of physical memory 106 that may be configured to temporarily store the one or more IP data packets received from coordinator layer 302. That is, privilege component 114 may be configured to designate one or more of physical memory pages 304 in physical memory 106 to store the IP data packets. In addition, physical memory pages 304 may be configured to be accessible primarily, if not exclusively, to coordinator layer 302 and privilege component 304. Since the read/write speed of physical memory 106 may be faster than the transmission speed via virtual NIC 112, transmitting and receiving IP data packets via physical memory pages 304 may be more efficient than transmission via virtual NIC 112.

In accordance with some examples, upon receiving one or more IP data packets from IP layer 110, coordinator layer 302 may detect whether physical memory pages 304 have enough storage capacity to store the one or more IP data packets. If so, coordinator layer 302 may be configured to write the one or more IP data packets into one or more of physical memory pages 304. If not, coordinator layer 302 may be configured to adjust the location of the one or more IP data packets, e.g., write only portions of the one or more IP data packets into physical memory 106 and write the rest of the one or more IP data packets when physical memory pages 304 have enough space.

Similarly, privilege component 114 may also detect whether physical memory pages 304 have enough storage capacity to store the one or more IP data packets when physical NIC 116 receives the one or more IP data packets from media device 118. If so, privilege component 114 may be configured to write the one or more IP data packets into physical memory pages 304. If not, similar to coordinator layer 302, privilege component 114 may be configured to adjust the location of the one or more IP data packets, e.g., write only portions of the one or more IP data packets into physical memory and write the rest of the one or more IP data packets when physical memory pages 304 have enough storage capacity.

Thus, FIG. 3 shows another example system 300 by which transmitting and receiving data on a virtual machine may be implemented, arranged in accordance with at least some embodiments described herein.

Figure 4:
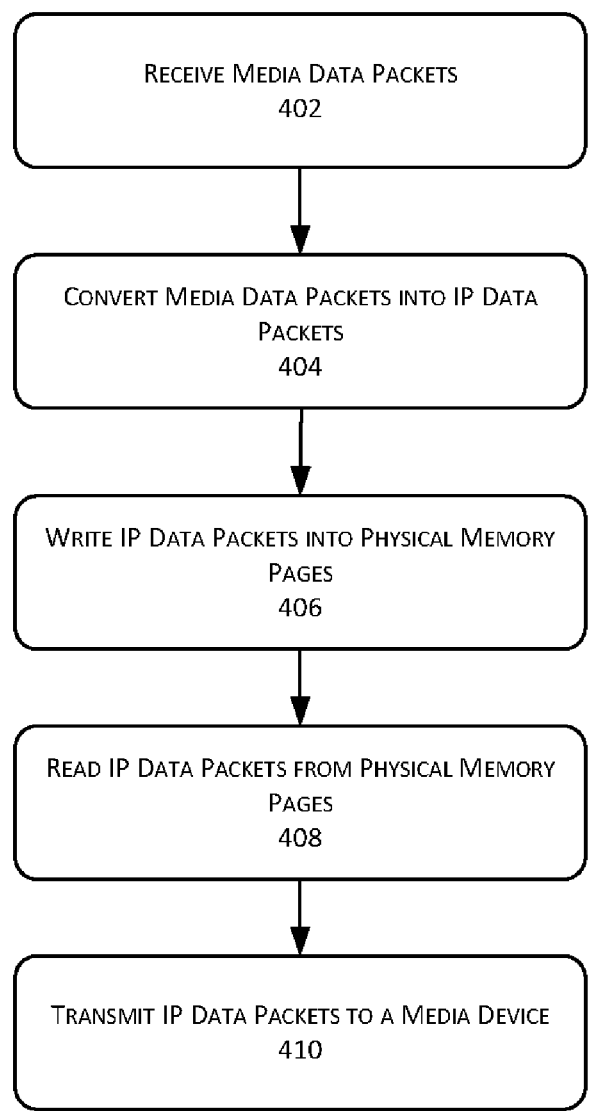
FIG. 4 shows an example configuration of a processing flow of operations by which transmitting data from a virtual machine may be implemented, arranged in accordance with at least some embodiments described herein.

FIG. 4 shows an example configuration of a processing flow 400 of operations by which transmitting data on a virtual machine may be implemented, arranged in accordance with at least some embodiments described herein. As depicted, processing flow 400 may include sub-processes executed by various components that are part of example systems 100 and 300. However, processing flow 400 is not limited to such components, and modification may be made by re-ordering two or more of the sub-processes described here, eliminating at least one of the sub-processes, adding further sub-processes, substituting components, or even having various components assuming sub-processing roles accorded to other components in the following description. Processing flow 400 may include various operations, functions, or actions as illustrated by one or more of blocks 402, 404, 406, 408, and 410. Processing may begin at block 402.

Block 402 (Receive Media Data Packets) may refer to IP layer 110 receiving one or more media data packets from virtual machines 104. That is, media application 202, as a software component executable on virtual machines 104, may be configured to process media files and to generate one or more media data packets. Media interceptor 204, as another software component executable on virtual machine 104, may be configured to intercept the one or more media data packets and to transmit the media data packets to IP layer 110. IP layer 110 may be configured to receive, or obtain, the one or more media data packets from media interceptor 204. Processing may continue from block 402 to 404.

Block 404 (Convert Media Data Packets into IP Data Packets) may refer to IP layer 110 converting the one or more media data packets into one or more IP data packets. That is, in accordance with some examples, IP layer 110 may be configured to retrieve the media data packets from media interceptor 204 and to convert, or pack, the media data packets into one or more IP data packets. In accordance with some examples, IP layer 110 may be configured to notify coordinator layer 302 when IP layer 110 has received the one or more media data packets and to transmit the one or more IP data packets to coordinator layer 302. Processing may continue from block 404 to 406.

Block 406 (Write IP Data Packets into Physical Memory Pages) may refer to coordinator layer 302 writing the one or more IP data packets into physical memory pages 304. In accordance with some example, the one or more IP data packets may not be written to physical memory pages 304 at the same time, e.g., physical memory pages 304 may not have enough space available for the one or more data packets. Coordinator layer 302 may be configured to include one or more buffers to temporarily store the one or more IP data packets. Processing may continue from block 406 to 408.

Block 408 (Read IP Data Packets from Physical Memory Pages) may refer to privilege component 114 reading the one or more IP data packets from physical memory pages 304. Similarly, the one or more IP data packets may not be read from physical memory pages at the same time. Privilege component 114 may be configured to include one or more buffers to temporarily store the one or more IP data packets. Processing may continue from block 408 to 410.

Block 410 (Transmit IP Data Packets to a Media Device) may refer to privilege component 114 transmitting the one or more IP data packets to media device 118, via physical NIC 116. That is, privilege component 114 may transmit the one or more IP data packets to physical NIC 116, which may be configured to further transmit the one or more IP data packets over network 120. When media device 118 is implemented as a wireless communication device, network 120 may refer to a wireless communication link. When media device 118 is implemented as one of virtual machines 104 executing on server 102, e.g., virtual machine 104A, block 410 may refer to coordinator layer 302 transmitting the IP data packets to virtual machine 104A.

Thus, FIG. 4 shows an example configuration of a processing flow 400 of operations by which transmitting data on a virtual machine may be implemented, arranged in accordance with at least some embodiments described herein.

Figure 5:
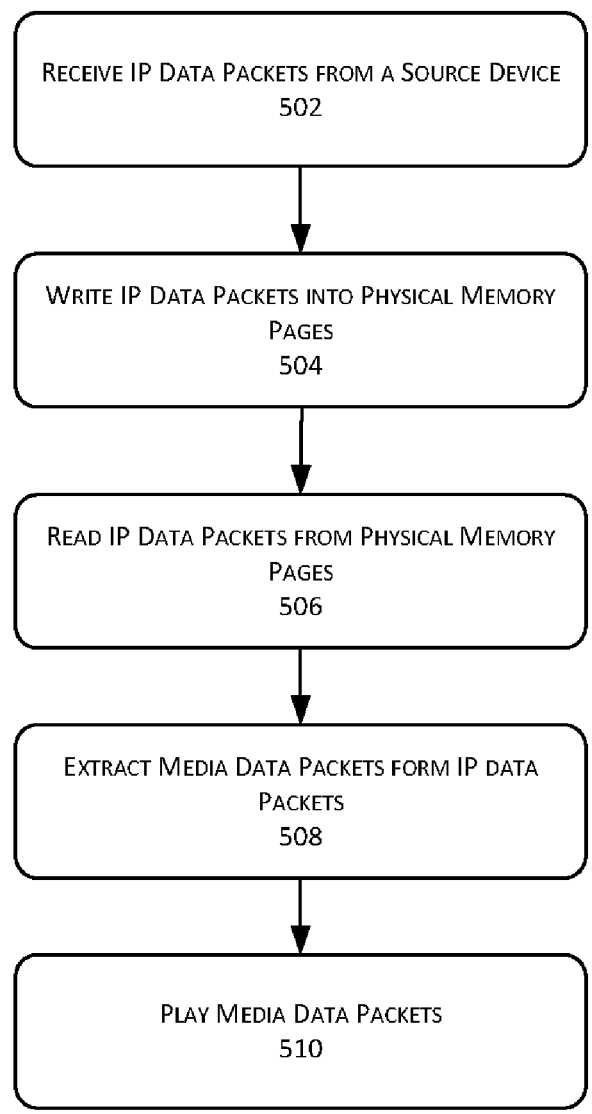
FIG. 5 shows an example configuration of a processing flow of operations by which receiving data at a virtual machine may be implemented, arranged in accordance with at least some embodiments described herein.

FIG. 5 shows an example configuration of a processing flow 500 of operations by which receiving data on a virtual machine may be implemented, arranged in accordance with at least some embodiments described herein. As depicted, processing flow 500 may include sub-processes executed by various components that are part of example systems 100 and 300. However, processing flow 500 is not limited to such components, and modification may be made by re-ordering two or more of the sub-processes described here, eliminating at least one of the sub-processes, adding further sub-processes, substituting components, or even having various components assuming sub-processing roles accorded to other components in the following description. Processing flow 500 may include various operations, functions, or actions as illustrated by one or more of blocks 502, 504, 506, 508, and 510. Processing may begin at block 502.

Block 502 (Receive IP Data Packets from a Source Device) may refer to physical NIC 116 receiving one or more IP data packets from a source device, e.g., media device 118. In accordance with some examples, media device 118 may be configured to process media files and to generate one or more media data packets. Further, media device 118 may be configured to convert the one or more media data packets into one or more IP data packets and to transmit the one or more IP data packets over network 120 that includes a wireless communication link. Physical NIC 116 may be configured to receive the one or more IP data packets from media device 118. Processing may continue from block 502 to 504.

Block 504 (Write IP Data Packets into Physical Memory Pages) may refer to privilege component 114 writing the one or more IP data packets to physical memory pages 304. That is, privilege component 114 may receive, or obtain, the one or more IP data packets from physical NIC 116 and write the one or more IP data packets into physical memory pages 304. Processing may continue from block 504 to 506.

Block 506 (Read IP Data Packets from Physical Memory Pages) may refer to coordinator layer 302 reading the one or more IP data packets from physical memory pages 304. Coordinator layer 302 may be configured to receive, or obtain, the one or more IP data packets from physical memory pages 304 and, further, to transmit the one or more IP data packets to IP layer 110. Processing may continue from block 506 to 508.

Block 508 (Extract Media Data Packets from IP Data Packets) may refer to IP layer 110 extracting one or more media data packets from the one or more IP data packets received from coordinator layer 302. IP layer 110 may further transmit the one or more media data packets to a corresponding virtual machine, e.g., virtual machine 104A. Processing may continue from block 508 to 510.

In accordance with some examples, when the source device is implemented as one or more of virtual machines 104 executing on server 102, coordinator layer 302 may be configured to receive the one or more IP data packets from the virtual machine via physical memory pages 304. Further, to extract the one or more media data packets from the one or more IP data packets, IP layer 110 may be configured to release one or more computing resources, e.g., one or more cores of a Central Processing Unit, for decoding the one or more IP data packets.

Block 510 (Play Media Data Packets) may refer to one of virtual machines 104 playing the one or more media data packets on a virtual media player. For example, virtual machine 104A may be configured to receive the one or more media data packets and play the media data packets on media application 202.

Thus, FIG. 5 shows an example configuration of a processing flow 500 of operations by which receiving data on a virtual machine may be implemented, arranged in accordance with at least some embodiments described herein.

Figure 6:
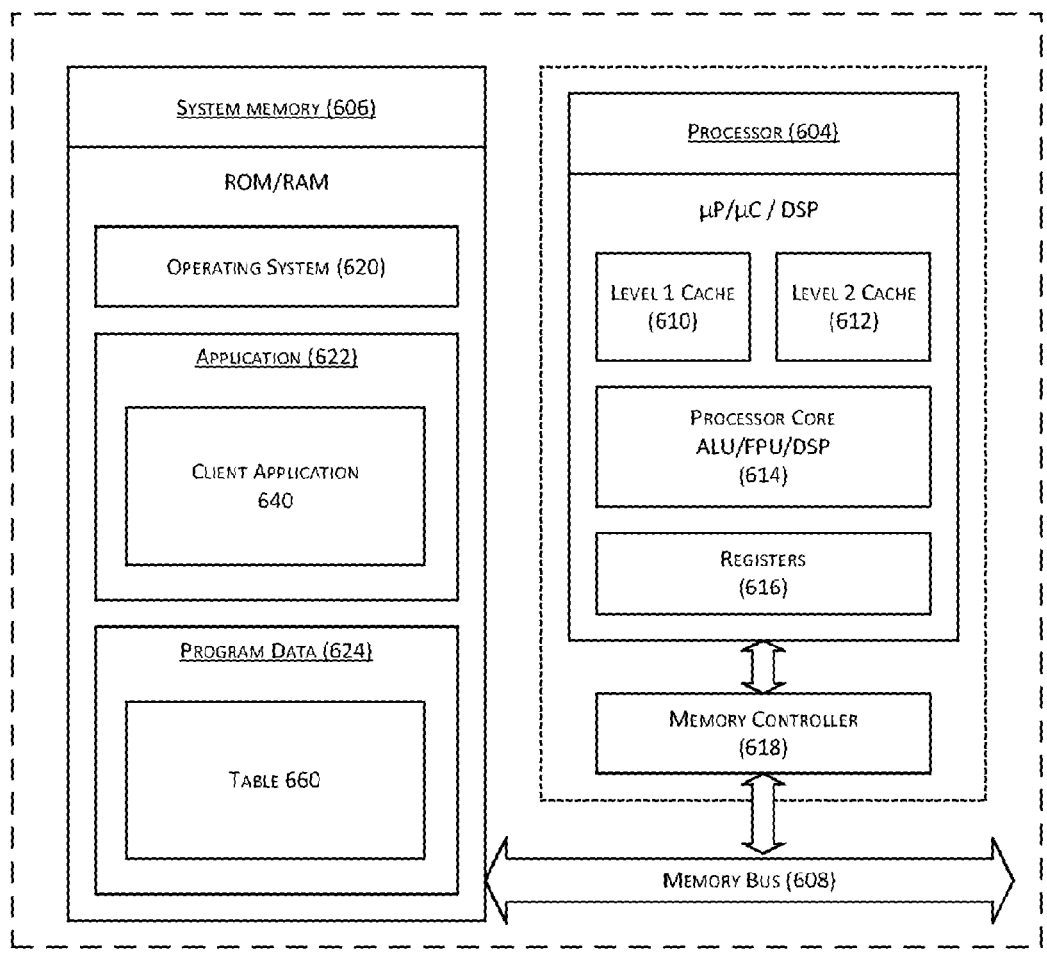
FIG. 6 shows a block diagram illustrating an example computing device that is arranged for data communication on a virtual machine, arranged in accordance with at least some embodiments described herein.

FIG. 6 shows a block diagram illustrating an example computing device that is arranged for data communication on a virtual machine, arranged in accordance with at least some embodiments described herein.

More particularly, FIG. 6 shows an illustrative computing embodiment, in which any of the processes and sub-processes described herein may be implemented as computer-readable instructions stored on a computer-readable medium. The computer-readable instructions may, for example, be executed by a processor of a device, as referenced herein, having a network element and/or any other device corresponding thereto, particularly as applicable to the applications and/or programs described above corresponding to the example wireless communication system.

In a very basic configuration, a computing device 600 may typically include one or more processors 604 and a system memory 606. A memory bus 608 may be used for communicating between processor 604 and system memory 606.

Depending on the desired configuration, processor 604 may be of any type including but not limited to a microprocessor (μP), a microcontroller (μC), a digital signal processor (DSP), or any combination thereof. The processor 604 may include one or more levels of caching, such as a level one cache 610 and a level two cache 612, a processor core 614, and registers 616. An example processor core 614 may include an arithmetic logic unit (ALU), a floating point unit (FPU), a digital signal processing core (DSP Core), or any combination thereof. An example memory controller 618 may also be used with the processor 604, or in some implementations the memory controller 618 may be an internal part of the processor 604.

Depending on the desired configuration, system memory 606 may be of any type including but not limited to volatile memory (such as RAM), non-volatile memory (such as ROM, flash memory, etc.) or any combination thereof. System memory 606 may include an operating system 620, one or more applications 622, and program data 624.

Application 622 may be configured to data communication on a virtual machine as described previously with respect to FIGS. 1-5 and further include a client application 640. Client application 640 may be configured to perform the executable instructions stored on system memory 606. The executable instructions may include processing flows described in FIGS. 4 and 5. Program data 624 may include a table 660, which may be useful for data communication on a virtual machine as described herein. Table 660 may refer to a data structure to store and organize data, e.g., internet indexing services. Examples of the data structure may include array data structure, record, hash, union, etc.

System memory 606 is an example of computer storage media. Computer storage media may include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 600. Any such computer storage media may be part of computing device 600.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein may be implemented, e.g., hardware, software, and/or firmware, and that the preferred vehicle may vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes for wireless communication system 100 via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs executing on one or more computers, e.g., as one or more programs executing on one or more computer systems, as one or more programs executing on one or more processors, e.g., as one or more programs executing on one or more microprocessors, as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as executing systems, drivers, graphical user interfaces, and applications programs, one or more interaction devices, such as a touch pad or screen, and/or control systems including feedback loops and control motors, e.g., feedback for sensing position and/or velocity; control motors for moving and/or adjusting components and/or quantities. A typical data processing system may be implemented utilizing any suitable commercially available components, such as those typically found in data computing/communication and/or network computing/communication systems.

The herein described subject matter sometimes illustrates different components contained within, or coupled with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Lastly, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases at least one and one or more to introduce claim recitations. However, the use of such phrases should not be construed to imply that the introduction of a claim recitation by the indefinite articles "a" or an limits any particular claim containing such introduced claim recitation to embodiments containing only one such recitation, even when the same claim includes the introductory phrases one or more or at least one and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

We claim:

1. A non-transitory computer-readable medium storing instructions that, when executed, cause one or more processors to perform operations, comprising:
   receiving one or more IP data packets from a source device;
   determining a first location in one or more physical memory pages in a physical memory to store the one or more IP data packets, wherein the one or more physical memory pages correspond to a coordinator layer;
   determining a capacity of the one or more physical memory pages;
   in response to a determination of a lack of capacity of the one or more physical memory pages to store the one or more IP data packets:
      writing the one or more IP data packets into the first location up to the determined capacity of the one or more physical memory pages;
      adjusting the first location to a second location in the physical memory to store a portion of the one or more IP data packets not stored in the first location;
      writing the portion of the one or more IP data packets into the second location;
      reading the one or more IP data packets successfully stored in the first location from the first location;
      extracting one or more media data packets from the one or more IP data packets successfully stored in and read from the first location;
      reading the portion of the one or more IP data packets from the second location; and
      extracting one or more media data packets from the portion of the one or more IP data packets; and
   in response to a determination of sufficient capacity of the one or more physical memory pages to store the one or more IP data packets:
      writing the one or more IP data packets into the first location;
      reading the one or more IP data packets from the first location; and
      extracting one or more media data packets from the one or more IP data packets, wherein the one or more IP data packets are received from a virtual machine via the one or more physical memory pages without utilizing virtual NIC, and wherein the reading and writing speed of the one or more physical memory pages is faster than a transmission speed via the virtual NIC.

2. The non-transitory computer-readable medium of claim 1, wherein the one or more IP data packets are received from a wireless communication device via a wireless communication link.

3. The non-transitory computer-readable medium of claim 1, wherein the operations further comprise preparing one or more virtual components to receive the one or more IP data packets.

4. The non-transitory computer-readable medium of claim 3, wherein the operations further comprise:
   releasing one or more computing resources; and
   decoding the one or more IP data packets.

5. The non-transitory computer-readable medium of claim 1, wherein the operations further comprise playing the one or more audio data packets on a virtual audio player.

6. The non-transitory computer-readable medium of claim 1, wherein the operations further comprise receiving the one or more IP data packets via a virtual NIC.

7. A method, comprising:
   receiving one or more IP data packets from a source device;
   determining a first location in one or more physical memory pages in a physical memory to store the one or more IP data packets, wherein the one or more physical memory pages correspond to a coordinator layer;
   determining a capacity of the one or more physical memory pages;
   in response to a determination of a lack of capacity of the one or more physical memory pages to store the one or more IP data packets:
      writing the one or more IP data packets into the first location up to the determined capacity of the one or more physical memory pages;
      adjusting the first location to a second location in the physical memory to store a portion of the one or more IP data packets not stored in the first location;
      writing the portion of the one or more IP data packets into the second location;
      reading the one or more IP data packets successfully stored in the first location from the first location;
      extracting one or more media data packets from the one or more IP data packets successfully stored in and read from the first location;
      reading the portion of the one or more IP data packets from the second location; and
      extracting one or more media data packets from the portion of the one or more IP data packets; and
   in response to a determination of sufficient capacity of the one or more physical memory pages to store the one or more IP data packets:
      writing the one or more IP data packets into the first location;
      reading the one or more IP data packets from the first location; and
      extracting one or more media data packets from the one or more IP data packets, wherein the one or more IP data packets are received from a virtual machine via the one or more physical memory pages without utilizing virtual NIC, and wherein the reading and writing speed of the one or more physical memory pages is faster than a transmission speed via the virtual NIC.

8. The method of claim 7, further comprising receiving the one or more IP data packets from a wireless communication device via a wireless communication link.

9. The method of claim 7, further comprising preparing one or more virtual components to receive the one or more IP data packets.

10. The method of claim 9, further comprising:
    releasing one or more computing resources; and
    decoding the one or more IP data packets.

11. The method of claim 7, further comprising playing the one or more audio data packets on a virtual audio player.

12. The method of claim 7, further comprising receiving the one or more IP data packets via a virtual NIC.

* * * * *